United States Patent [19]

Dotson et al.

[11] Patent Number: 5,430,100
[45] Date of Patent: Jul. 4, 1995

US005430100A

[54] HIGH IMPACT AND LOW CREASE STRESS WHITENING ABS BLENDS

[75] Inventors: Seldon L. Dotson, Parkersburg; Larry B. Simmons, Washington, both of W. Va.

[73] Assignee: General Electric Company, Pittsfield, Mass.

[21] Appl. No.: 205,973

[22] Filed: Mar. 3, 1994

[51] Int. Cl.6 .............................................. C08L 51/04
[52] U.S. Cl. ...................................... 525/71; 525/316
[58] Field of Search ................................ 525/71, 316

[56] References Cited

U.S. PATENT DOCUMENTS 4,567,233  1/1986  Tomono et al. ............... 525/71

Primary Examiner—James J. Seidleck
Assistant Examiner—Mark L. Warzel

[57] ABSTRACT

Blends of ABS polymers with different substrate particle sizes are disclosed having a desirable balance of impact resistance, crease stress whitening, and melt viscosity. These compositions are useful in thin guage ABS films.

6 Claims, No Drawings

1

HIGH IMPACT AND LOW CREASE STRESS WHITENING ABS BLENDS

BACKGROUND OF THE INVENTION

This invention relates to high impact resistant polymers. This invention further relates to low crease stress whitening polymers.

Polymers with a desirable balance of impact resistance and low crease stress whitening are difficult to obtain. Most often, an improvement in one of these polymer properties, impact resistance or crease stress whitening, results in a deterioration of the other property. Thus, it would be desirable to have a polymer with a desirable balance of impact resistance and crease stress whitening. Such polymers are useful for making, by extrusion or calendering processes, thin packaging film and/or laminating film that is subjected to impact abuse during its service life and requires a minimum of crease whitening for asthetic reasons. One example of such a use would be in travel luggage or suit case exteriors.

SUMMARY OF THE INVENTION

In one aspect, this invention is a blend of acrylonitrile-butadiene-styrene (ABS) polymers with different substrate particle sizes in amounts and sizes sufficient to produce a desirable balance of impact resistance (greater than 6.0 ft-lbs/in Rt ⅛" Izod) and crease stress whitening for use in packaging or laminating film. The ratio of one ABS component to another ABS component can be adjusted to obtain the desired balance of impact resistance, crease whitening, and melt viscosities (2800-3000 MKgms as measured by a Number 5 head Brabender with roller blades at 180° C. and 30 RPM; or $3.68 \times 10^4$ poise at 100 $sec^{-1}$ to $6.20 \times 10^3$ poise at 100 $sec^{-1}$ as measured by capillary rheometry at 200° C. using a 0.041' 15/1 orifice.) The term "ABS component" as used herein refers to an ABS polymer in polymerized form.

In another aspect, this invention is a blend of ABS polymers with different substrate particle sizes in amounts and sizes sufficient to produce a desirable balance of both room temperature (23° C. ±2° C.) and low temperature (−18° C. ±2° C.) impact resistance, and crease stress whitening for use in thin gauge ABS films (0.007 inch to 0.015 inch). The ratio of one ABS component to another ABS component can be adjusted to obtain the desired balance of impact resistance, crease whitening, and melt viscosities.

In a third aspect, this invention is a blend of a general purpose (suitable for extrusion, injection molding and calendering) high impact (7.0 ft-lbs/in ⅛" RT notched Izod)ABS, such as Blendex ® 131 Modifier commercially available from GE Specialty Chemicals, Inc., with a clear low crease whitening ABS, such as Blendex ® 424 Modifier commercially available from GE Specialty Chemicals, Inc. The ratio of one ABS component to another ABS component can be adjusted to obtain the desired balance of impact resistance, crease whitening, and melt viscosities.

In a fourth aspect, this invention is a blend of ABS polymers with different substrate particle sizes resulting in a melt viscosity needed for calendering large sheets.

DETAILED DESCRIPTION OF THE INVENTION

The ABS polymers of this invention comprise a two phase system. The two phase system comprises a polybutadiene or polybutadiene/styrene rubber substrate with a copolymer of styrene acrylonitrile (SAN) attached to it. This substrate is commonly referred to as the "graff phase" because the SAN is physically attached or grafted to the rubber through a chemical reaction that occurs simultaneously with the polymerization of the SAN copolymer. The SAN portion not grafted to the rubber substrate is commonly referred to as the "free rigid phase". The graft phase is dispersed throughout the rigid phase SAN which forms the polymer continuum. The rubber interface is the surface forming the boundaries between the graft and rigid phases. The grafted SAN acts as compatibilizer between the rubber and rigid SAN at this interface and prevents the separation of these two otherwise immisible phases.

One ABS polymer component suitable for use in this ABS blend invention has a composition of 17-22/30-37/40-48 A/B/S where A is acrylonitrile, B is butadiene, and S is styrene. All ratios stated herein are in weight percent unless indicated otherwise. Preferably the ABS composition is 19-21/32-36/40-46. More preferably the ABS composition is 19-20/31-35/43-45. Most preferably the composition is 20/35/45 A/B/S. A suitable polybutadiene substrate contains divinylbenzene (DVB) at levels ranging from zero to 1 part by weight and a particle size range of 2700 to 3500 angstroms. A preferred polybutadiene substrate contains DVB at levels ranging from zero to 0.75 parts by weight and a particle size range of 2800 to 3100 angstroms. A more preferred polybutadiene substrate contains DVB at levels ranging from zero to 0.5 parts by weight and a particle size range of 2900 to 3100 angstroms. The most preferred polybutadiene substrate contains no DVB and a particle size range of 2800 to 3050 angstroms. A suitable styrene/acrylonitrile (S/AN) ratio is 7.1-1.8/1.0. A preferred S/AN ratio is 5.5-1.5/1.0. A more preferred S/AN ratio is 6-1.7/1.0. The most preferred S/AN ratio is 2.25/1 which has a free rigid number average molecular weight (Mn) of 47,000. Suitably, the graft phase (polybutadiene plus grafted SAN) is 38-50 of the total polymer and the free rigid phase (ungrafted SAN) is 62-60%. Preferably, the graft phase is 41-49 of the total polymer and the free rigid phase is 57-59%. More preferably, the graft phase is 44-47 of the total polymer and the free rigid phase is 55-56%. Most preferably, the graft phase is 46% of the total polymer and the free rigid phase is 54%. Suitably 18-20% of the total SAN is grafted to the polybutadiene. Preferably, 15-17% of the total SAN is grafted to the polybutadiene. More preferably, 12-14% of the total SAN is grafted to the polybutadiene. Most preferably 11% of the total SAN is grafted to the polybutadiene. A suitable grafted SAN has a number average molecular weight (Mn) of 28,000 to 38,000. A preferred grafted SAN has an Mn of 32,000 to 38,000. A more preferred grafted SAN has an Mn of 34,000 to 37,000. The most preferred grafted SAN has an Mn of 36,000. Blendex ® 131 Modifier is an example of one such ABS which is commercially available from GE Specialty Chemicals, Inc. Suitably, Blendex ® 131 Modifier or an equivalent ABS polymer is used at about 30-60% by weight of the total composition in semi-rigid polyvinyl chloride (PVC) compounds. Preferably, Blendex ® 131 Modifier or an equivalent ABS polymer is used at about 35-55% in semi-rigid PVC compounds. More preferably, Blendex ® 131 Modifier or an equivalent ABS polymer is used at about 38–53% in semi-rigid PVC compounds. Most preferably, Blendex ® 131 Modifier or an equivalent ABS polymer is used at about 40–50% in semi-rigid PVC compounds.

A second ABS polymer component suitable for use in this invention has a composition of 7–12/45–80/25–90/0–95 A/B/S/DVB. Preferably the ABS composition is 8–11/50–75/28–50/0–75. More preferably the ABS composition is 9–10/54–65/29–35/1–15. Most preferably the composition is 9.93/57.85/30.93/1.3 A/B/S/DVB. Suitably the polymer comprises 75–30% substrate and 45–15% SAN. Preferably, the polymer comprises 70–35% substrate and 40–20% SAN. More preferably, the polymer comprises 68–40% substrate and 37–25% SAN. Most preferably, the polymer comprises 65% substrate and 35% SAN. The 65% polybutadiene/styrene/acrylonitrile/divinylbenzene substrate has a composition 2.93/57.85/2.93/1.3 A/B/S/DVB and a particle size of 700 Angstroms. This substrate has 22.9 parts of the 35% SAN grafted to it, and is commonly called a "high rubber graft modifier". The grafted SAN suitably has a Mn of 10,000–40,000. Preferably the grafted SAN has a Mn of 20,000–35,000. More preferably the grafted SAN has a Mn of 25,000–33,000. Most preferably the grafted SAN has a Mn of 30,000. Suitably, the S/AN ratio is 4.75/1 and free rigid SAN has a Mn of 15,000 and comprises 20% of the total polymer. Preferably, the S/AN ratio is 4.6/1 and free rigid SAN has a Mn of 25,000 and comprises 15% of the total polymer. More preferably, the S/AN ratio is 4.4/1 and free rigid SAN has a Mn of 40,000 and comprises 10–0% of the total polymer. Most preferably, the S/AN ratio is 4/1 and free rigid SAN has a Mn of 35,000 and comprises 12.1% of the total polymer. Blendex ® 424 Modifier is an example of one such ABS which is commercially available from GE Specialty Chemicals, Inc. Suitably, Blendex ® 424 Modifier or an equivalent ABS polymer is used at about 4.0 to 9.0 parts per hundred resin (phr). Preferably, Blendex ® 424 Modifier or an equivalent ABS polymer is used at about 4.2–8.8 phr. More preferably, Blendex ® 424 Modifier or an equivalent ABS polymer is used at about 4.5–8. Sphr. Most preferably, Blendex ® 424 Modifier or an equivalent ABS polymer is used at about 5–8 phr in rigid clear calendered low crease whiting PVC packing film.

Table 1 summarizes the composition of the two aforementioned commercially available, exemplary ABS polymers; Blendex ® 131 Modifier and Blendex ® 424 Modifier.

TABLE NO. 1

|  | COMPOSITION, by weight % | | | | Mw | S/ACN | % |
|---|---|---|---|---|---|---|---|
|  | Acrylonitrile | Butadiene | Styrene | Divinylbenzene | | | |
| BLENDEX 131 | | | | | | | |
| Total Polymer | 20 | 35 | 45 | — | — | — | — |
| Rigid Phase | 16.62 | — | 37.39 | — | $4.7 \times 10^4$ | 2.25/1 | 54.0 |
| Graft Phase | 3.38 | 35 | 7.61 | — | $3.6 \times 10^4$ | 2.25/1 | 46.0 |
| Substrate | — | 35 | — | — | — | — | — |
| Substrate PSD, Angstroms | — | 2800 3050 | — | — | — | — | — |
| BLENDEX 424 | | | | | | | |
| Total Polymer | 9.93 | 57.85 | 30.93 | 1.3 | — | — | — |
| Rigid Phase | 2.4 | — | 9.6 | — | $3.5 \times 10^4$ | 4/1 | 12.0 |
| Graft Phase | 7.53 | 57.85 | 21.33 | 1.3 | $3.0 \times 10^4$ | 4/1 | 88.0 |
| Substrate | 2.93 | 57.85 | 2.93 | 1.3 | — | — | — |
| Substrate PSD, Angstrom | — | 700 | — | — | — | — | — |

Suitable ABS polymer compositions, such as Blendex ® 131 Modifier and Blendex ® 424 Modifier, are blended together using normal melt mixing equipment such as Banbury and Mill/Farrel continuous mixers, and single and twin screw extruders. Suitable ratios of the two ABS polymer components of this invention employable to achieve the desired balance of impact resistance and stress crease whitening are 75/25 to 80/25 stated in terms of the large butadiene substrate particle size component/small SBR/ACN substrate particle size component. Preferred ratios of the two ABS polymer components of this invention employable to achieve the desired balance of impact resistance and stress crease whitening are 60/40 to 85/15. More preferred ratios of the two ABS polymer components of this invention to achieve the desired balance of impact resistance and stress crease whitening are 55/45 to 88/12. The most preferred ratio of ABS polymer components of this invention to achieve the desired balance of impact resistance and stress crease whitening are 50/50 to 90/10. Optionally, antioxidants and external metal release lubricants are added to the polymer system to protect the polymers during the mixing and the final processing steps.

Table 2 contains impact resistance, processing, and crease whitening data for the two aforementioned commercially available, exemplary ABS polymers; Blendex ® 131 Modifier and Blendex ® 424 Modifier.

TABLE 2

|  | A | B | C | D | E | F | G |
|---|---|---|---|---|---|---|---|
| Blendex 131 | 50.0 | 70 | 75 | 80 | 85 | 90 | 100 |
| Blendex 424 | 50.0 | 30 | 25 | 20 | 15 | 10 | 0 |
| Weston ODPP, antioxidant | 1.0 | → | → | → | → | → | → |
| Ethylene-bis-stearmide wax | 0.5 | → | → | → | → | → | → |
|  | IMPACT | | | | | | |
| ⅛" RT Notched Izod, ft-lbs/in | 2.9 | 3.53 | 3.42 | 3.54 | 3.98 | 4.54 | 7.32 |
| RT Gardner Dart, in-lbs/mil 20 mil film | 0.4 | 0.94 | 0.89 | 1.01 | 0.98 | 1.14 | 1.70 |

BRABENDER TORQUE RHEOMETER
(180° C., 60 RPM, No. 5 Head, 43 Grams)

TABLE 2-continued

| Time, Minutes | A | B | C | D | E | F | G |
|---|---|---|---|---|---|---|---|
| | | | | Torque, MK gm | | | |
| 5 | — | 2371 | — | 2306 | — | 2435 | 2671 |
| 15 | — | 2229 | — | 2306 | — | 2252 | 2707 |
| 25 | — | 2337 | — | 2370 | — | 2409 | 2865 |
| 35 | — | 2427 | — | 2422 | — | 2534 | 2828 |
| 45 | — | 2502 | — | 2527 | — | 2610 | 3249 |
| 55 | — | 2546 | — | 2585 | — | 2674 | 3522 |

CAPILLARY RHEOMETER VISCOSITY, POISE × $10^4$, 190° C., 0.041 ORIFICE, 15/1, L/D

| Shear Rate, Sec.$^{-1}$ | | | | | | | |
|---|---|---|---|---|---|---|---|
| 100 | | | | 4.172 | 4.211 | 4.139 | 4.218 |
| 500 | | | | 1.229 | 1.253 | 1.245 | 1.204 |
| 1000 | | | | 0.726 | 0.743 | 0.7419 | 0.702 |

Sample A demonstrates excellent low crease whitening. However, the impact strength of Sample A is too low for film applications. Sample B demonstrates the other end of the impact/crease whitening spectrum, i.e. the impact is excellent but crease whitening is at a maximum level. Samples A and G represent the limits of the impact resistance and stress whitening properties. Between these two samples, illustrated by B through F, are gradations of these two properties. Samples C, D, and E offer a suitable range of impact, crease whitening, and fall in the melt viscosity range for acceptable processing by extrusion and calendering. These samples can also be used in injection molding applications.

Samples contained in Table No. 2 were prepared by melt mixing in a 1000 cc laboratory Banbury mixer at 350° F. for three minutes. The melt was placed on a two roll mill at 325° F. and milled into a 0.125 inch sheet which was cut into strips for granulation. The granulated material was injection molded into ⅛ and ¼ inch impact bars for impact testing. These granules were also extruded into 25 mil thick by 3 inch wide film for impact testing by the Gardner dart method.

The ABS compounds referred to in the preceding paragraphs were prepared from resin produced by emulsion polymerization. A phosphite antioxidant (Weston TNPP) and ethylene bis-stearimide wax were added to this resin for lubrication to protect the resin from oxidation during the melt mixing stage, to provide metal release, and enhance melt flow during injection molding and extrusion. The additives were added to the compound based on a parts per hundred resin basis.

The blend offering the most desirable balance of impact resistance, crease whitening, and viscosity properties for commercial purposes is the 80/20 blend of Blendex 131/424 Modifiers. This sample is prepared by combining 800 grams of Blendex 131 Modifier, 200 grams of Blendex 424 Modifier, 2 grams of Weston ®TNPP, and 5 grams of ethylene bisstearamide wax for Barbuny melt mixing. Other optional ingredients such as pigments or additional lubricants can be added as needed. After melt mixing with a Banbury mixer, this blend can be processed by calendering, extrusion, or injection molding.

We claim:

1. An acrylonitrile, butadiene, styrene composition comprising a blend of a first acrylonitrile, butadiene, styrene composition component having large butadiene substrate particle size of about 2500 to 3000 angstroms and a second acrylonitrile, butadiene, styrene composition component having a small butadiene substrate particle size of about 700 angstroms, said first and second acrylonitrile, butadiene, styrene composition components being present in a ratio of said to first to said second of 50/50 to 90/10, said first composition comprising from about 19 to 21 weight percent acrylonitrile, about 31-35 weight percent butadiene, and from about 43 to 45 weight percent styrene, said first composition comprising about 0 parts by weight of divinylbenzene and having a ratio of styrene to acrylonitrile of 5.5-1.5/1.0, said second composition comprising from about 8 to 11 weight percent acrylonitrile, about 50-75 weight percent butadiene, and from about 28 to 50 weight percent styrene, said second composition comprising from about 1 to 15 parts by weight of divinylbenzene.

2. The composition of claim 1 wherein said first composition comprises about 20 weight percent acrylonitrile, about 35 weight percent butadiene, and from about 45 weight percent styrene.

3. The composition of claim 2 wherein said second composition comprises about 9 to 10 weight percent acrylonitrile, about 54-65 weight percent butadiene, and from about 29 to 35 weight percent styrene.

4. The composition of claim 3 wherein said first composition has a ratio of styrene to acrylonitrile of 2.25/1.0.

5. The composition of claim 4 wherein said second composition has a ratio of styrene to acrylonitrile of 4/1.0.

6. The composition of claim 5 wherein said first and second ABS components are present in a ratio of said to first to said second acrylonitrile, butadiene, styrene composition of 55/45 to 88/12 and said composition consists essentially of an acrylonitrile, butadiene, styrene film having a thickness of 0.007 inch to 0.015 inch and having an impact resistance greater than 6.0 ft-lbs/in Rt ¼ inch Izod.

* * * * *